United States Patent [19]
Leutwyler

[11] Patent Number: 5,571,234
[45] Date of Patent: Nov. 5, 1996

[54] METHOD OF REMOVING INORGANIC METALLIC COMPOUNDS FROM SOLUTIONS

[76] Inventor: René Leutwyler, Oberdorfstrasse 9, CH-5506 Mëgenwil, Switzerland

[21] Appl. No.: 390,646

[22] Filed: Feb. 17, 1995

[30] Foreign Application Priority Data

Mar. 25, 1994 [DE] Germany .................. 44 10 347.6

[51] Int. Cl.⁶ .................................................... B01D 9/04
[52] U.S. Cl. ............................................ 62/539; 62/124
[58] Field of Search ............................ 62/124, 538, 539

[56] References Cited

U.S. PATENT DOCUMENTS

| | | | |
|---|---|---|---|
| 3,513,212 | 5/1970 | Skrebowski et al. | 62/538 |
| 4,178,776 | 12/1979 | Baldus et al. | 62/538 |
| 5,090,965 | 2/1992 | Kelm et al. | 62/538 |

*Primary Examiner*—Ronald C. Capossela
*Attorney, Agent, or Firm*—Tarolli, Sundheim, Covell, Tummino & Szabo

[57] ABSTRACT

Inorganic metallic compounds, particularly salts, oxides and hydroxides, are removed from solutions by removing at least a part of the solution liquid and stirring and cooling this part while in the metastable state until a crystallization of the metallic compounds is rendered possible. Then energy is fed in bursts to the cooled down part in order to initiate the crystallization. The crystallized metallic compounds are separated, leaving a residual liquor which then is transferred back to the solution.

7 Claims, 1 Drawing Sheet

METHOD OF REMOVING INORGANIC METALLIC COMPOUNDS FROM SOLUTIONS

FIELD OF THE INVENTION

The present invention refers to a method of removing inorganic metallic compounds from solutions by cooling the solution. Particularly, the invention refers to a method of removing salts, oxides and hydroxides from solutions by cooling.

BACKGROUND OF THE INVENTION

Up to now, it appeared not to be possible to remove disturbing decomposition products from electrolytic baths and from waste water produced generally by the galvanic industry, particularly by the hot dip galvanizing industry, by the hardening industry and by numerous other industries without an interruption of the production.

OBJECT OF THE INVENTION

It is an object of the invention to provide a method of removing inorganic metallic compounds from solutions by cooling the solution without the need to interrupt the production.

SUMMARY OF THE INVENTION

To meet this and other objects, the invention provides a method of removing inorganic metallic compounds, particularly salts, oxides and hydroxides, from solutions by cooling the solution.

DETAILED DESCRIPTION OF THE INVENTION

Figure 1:
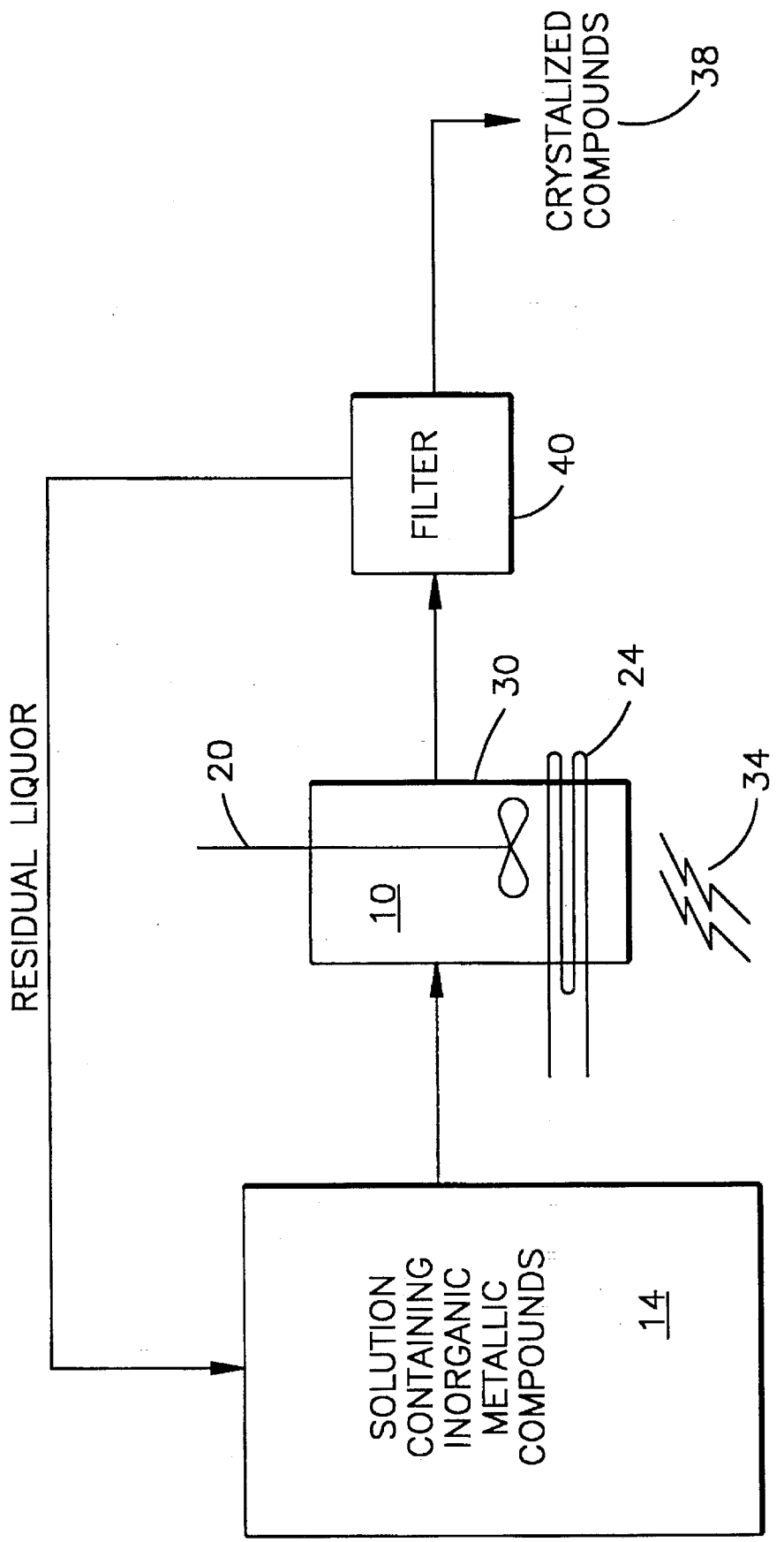
FIG. 1 is a schematic flow diagram illustrating the present invention.

According to the invention, in a first step, at least part 10 of the solution 14 liquid is removed from the solution containing the inorganic metallic compounds. In a second step, the removed part 10 is stirred 20 and cooled 24 in a cooling container 30 while in the metastable state until a crystallization of the metallic compounds is rendered possible in this part 10.

Thereafter, energy 34 is fed in bursts to the cooled down part 10 in order to initiate the crystallization. Finally, the crystallized metallic compounds 38 are filtered 40 from the part 10, leaving a residual liquor 44, and the residual liquor 44 is transferred back to the solution 14.

The above mentioned burst feeding of energy 34 can be accomplished by a single energy burst or by a plurality of individual energy bursts fed one after the other one.

The forms of energy which appear to be most suitable for the burst feeding of energy 34 are:

ultrasonic energy (four times 15 seconds, 600 W);

direct current energy (four times 15 s, 5 V/5 A=25 W);

alternating current energy (four times 15 s, 42 V / 1.2 A=50.4 W);

micro wave energy;

magnetic energy;

laser radiation energy;

infrared radiation energy; and ultraviolet radiation energy.

Preferably, the stirring 20 and cooling 24 of the part 10 of removed solution is continued until a first temperature is reached at which an exothermic reaction starts. This exothermic reaction is caused by the liberation of the heat of crystallization. Subsequently, the stirred and cooled part 10 of removed solution is kept at a second temperature which is 0.5° to 1° C. below the above mentioned first temperature during 2 to 4 minutes prior to separating the inorganic metallic compounds 38 from the part 10 of removed solution.

It has proven advantageous to apply a cooling rate in the cooling container 30 of –0.3° to –0.7° C./minute, preferably of –0.5° C./minute.

The method of the invention is particularly suitable for the treatment of the following media:

cyanide containing zinc electrolytes;

cyanide containing copper and copper plating electrolytes;

cyanide containing brass electrolytes;

cyanide containing cadmium electrolytes;

cyanide containing bronze electrolytes;

cyanide containing silver and silver plating electrolytes;

cyanide containing decoction and degreasing electrolytes;

cyanide containing tin electrolytes.

The method according to the invention can be used for removing:

iron dichloride in hydrochloric mordanting baths;

iron dichloride in sulfuric mordanting baths;

$Al(OH)_3$;

$AlSO_4$;

potassium carbonate; and waste water of hardening plants.

Preferably, the stirring apparatus used is a slow-speed cone stirrer (cf. Swiss Patent No. 675,215) sold by Viscojet AG, Basle (Switzerland), under the trade name "Viscojet". A preferred stirrer of this kind has a container diameter of 50 cm, a cone diameter of 32 cm, and is working at 60 to 100 r.p.m., preferably at 80 r.p.m. Under these conditions, no big crystals, and particularly no needle shaped crystals, can be formed.

The method according to the present invention provides essential technical, ecological and economical advantages, the most important of them being as follows:

The method avoids production interrupts; thus, it is ensured that the medium, i.e. the solution 14, has an optimal and constant composition and a longer useful life, resulting in an improved and constant product quality.

The method reduces the abduction of the desired components of the solution and, thus, a reduced amount of waste water accumulates.

The method reduces electric power consumption and requires less chemicals.

There are no deposits on the container walls and on the stirrer 20. The separated inorganic metallic compounds 38 can very easily be re-dissolved in cold water. So far, re-dissolution of crystallized inorganic metallic compounds, even in hot water, was very hard, if possible at all. As a result of this ease of re-dissolution, smaller quantities of waste water are produced, which in turn involve smaller labor and waste disposal costs.

In executing such waste disposal, the precipitated inorganic metallic compounds are preferably re-dissolved, and the small quantities of co-precipitated plating metal are electrolyticly separated from the obtained solution. Thereby, about 80% of the co-precipitated cyanides are oxidized to cyanates. At the same time, the metal ions are reduced at the cathode to metal.

EXAMPLE

From a bath of hydrochloric mordanting agent with an iron content of 196 g/l, an amount of 55 to 60 l bath liquid is removed and plumped into a cooling vessel having a diameter of 50 cm and a height of 35 cm. Then, the stirring apparatus of the type "Vioscojet 55 ST/v" incorporating a stirrer with a diameter of 32 cm is operated at a speed of 80 rpm.

Simultaneously, the cooling is switched on and controlled such that the liquid in the vessel is cooled down at a rate of −0.5° C./min, starting from an initial temperature of 30° C. As soon as a temperature of −4.1° C. is reached, a total of four 600 W ultrasonic energy bursts are fed, each during 15 s. Thus, the crystallization starts. Simultaneously, due to the liberation of the heat of crystallization of the so formed fine grain crystal suspension, an exothermic reaction, a so-called "temperature transition", occurs which causes a rise in temperature to −2.4° C. After 18 to 20 min, the temperature sank to −2.8° C. again and the crystallization was terminated.

Thereafter, the so obtained crystal suspension, in which the crystals had a size of appr. 0.3 to 0.4 mm, has been drained under continuous stirring and, finally, filtered with a filter having a mesh size of 0.2 mm. About 20 kg $FeCl_2$ are obtained.

Now, the treated bath liquid is pumped back to the bath of hydrochloric mordanting agent and the apparatus, which did not show any deposits on its walls and stirrer, was cleaned. It was then ready for the treatment of another charge.

Preferably all essential parameters are automatically controlled by level control, temperature sensing and timer means.

What is claimed is:

1. A method of removing inorganic metallic compounds, particularly salts, oxides and hydroxides, from solutions by cooling the solution, said method comprising the steps of:

removing from said solution containing said inorganic metallic compounds at least part of its solution liquid;

stirring and cooling, in a cooling container, said part of its solution liquid while in the metastable state until a crystallization of the metallic compounds is rendered possible in said cooled down part;

feeding energy in bursts to said cooled down part in order to initiate the crystallization;

separating the crystallized metallic compounds from said cooled down part, leaving a residual liquor; and transferring said residual liquor back to said solution.

2. A method according to claim 1 in which said energy bursts fed to said cooled down part are selected from the group consisting of ultrasonic energy, direct current energy, alternating current energy, micro wave energy, magnetic energy, laser radiation energy or ultraviolet radiation energy.

3. A method according to claim 1 in which said step of stirring and cooling said part is continued until a first temperature is reached at which an exothermic reaction starts that is caused by the liberation of the heat of crystallization, and further comprising the step of subsequently keeping said stirred and cooled part at a second temperature which is 0.5° to 1° C. below said first temperature during 2 to 4 minutes prior to separating said inorganic metallic compounds from said part.

4. A method according to claim 1 in which the cooling rate in the cooling container is −0.3° to −0.7° C./minute.

5. The method of claim 1 wherein the solution is an aqueous solution.

6. A method of removing inorganic metallic compounds, particularly salts, oxides and hydroxides, from solutions by cooling the solution, said method comprising the steps of:

removing from said solution containing said inorganic metallic compounds at least part of its solution liquid;

stirring and cooling, in a cooling container, said part of its solution liquid while in the metastable state until a crystallization of the metallic compounds is rendered possible in said cooled down part;

feeding energy in a plurality of individual energy bursts to said cooled down part in order to initiate the crystallization;

separating the crystallized metallic compounds from said cooled down part, leaving a residual liquor; and transferring said residual liquor back to said solution.

7. The method of claim 6 wherein the solution is an aqueous solution.

* * * * *